(12) United States Patent
Sauve et al.

(10) Patent No.: US 11,799,894 B2
(45) Date of Patent: Oct. 24, 2023

(54) DUAL NETWORK SECURITY ASSESSMENT ENGINE

(71) Applicant: Avast Software s.r.o., Prague (CZ)

(72) Inventors: Alain G. Sauve, Ottawa (CA); Syed Kamran Bilgrami, Ottawa (CA)

(73) Assignee: Avast Software s.r.o., Prague (CZ)

( * ) Notice: Subject to any disclaimer, the term of this patent is extended or adjusted under 35 U.S.C. 154(b) by 755 days.

(21) Appl. No.: 16/566,449

(22) Filed: Sep. 10, 2019

(65) Prior Publication Data

US 2020/0106799 A1 Apr. 2, 2020

Related U.S. Application Data

(60) Provisional application No. 62/738,620, filed on Sep. 28, 2018.

(51) Int. Cl.
*H04L 9/40* (2022.01)
*G06F 16/28* (2019.01)

(52) U.S. Cl.
CPC ........ *H04L 63/1433* (2013.01); *G06F 16/285* (2019.01)

(58) Field of Classification Search
None
See application file for complete search history.

(56) References Cited

U.S. PATENT DOCUMENTS

| 2006/0218369 | A1* | 9/2006 | Fujino | G06F 3/0605 |
| | | | | 711/170 |
| 2006/0218639 | A1 | 9/2006 | Newman et al. | |
| 2007/0143851 | A1* | 6/2007 | Nicodemus | G06F 21/577 |
| | | | | 726/25 |
| 2016/0127417 | A1 | 5/2016 | Janssen | |

FOREIGN PATENT DOCUMENTS

WO 2016064433 A1 4/2016

* cited by examiner

*Primary Examiner* — Cai Y Chen
(74) *Attorney, Agent, or Firm* — AVEK IP, LLC; Mark C. Young; William B. Kircher

(57) ABSTRACT

A method of determining the security condition of a network includes executing an agent program on one or more computerized devices coupled to the network. Each executing agent program executes one or more security tests and reports the results of such tests to a network assessment engine, and the network assessment engine determines an authoritative security test score and a configurable security test score for the network based on a weighted combination of the security test results.

20 Claims, 4 Drawing Sheets

FIG. 3

| OVERALL SCORE (AUTHORITATIVE): 65% | | | | | | |
|---|---|---|---|---|---|---|
| CATEGORY 1 SCORE: 40% WEIGHT: 2 | | | CATEGORY 2 SCORE: 80% WEIGHT: 1 | | CATEGORY 3 SCORE: 100% WEIGHT: 1 | |
| TEST 1 SCORE: 25% WEIGHT: 8 | TEST 2 SCORE: 100% WEIGHT: 1 | TEST 3 SCORE: 100% WEIGHT: 1 | TEST 4 SCORE: 60% WEIGHT: 1 | TEST 5 SCORE: 100% WEIGHT: 1 | TEST 6 SCORE: 100% WEIGHT: 3 | TEST 7 SCORE: 100% WEIGHT: 5 |

FIG. 4

| OVERALL SCORE (CONFIGURABLE): 82.5% | | | | | | |
|---|---|---|---|---|---|---|
| CATEGORY 1 SCORE: 75% WEIGHT: 2 | | | CATEGORY 2 SCORE: 80% WEIGHT: 1 | | CATEGORY 3 SCORE: 100% WEIGHT: 1 | |
| TEST 1 SCORE: 25% WEIGHT: 1 | TEST 2 SCORE: 100% WEIGHT: 1 | TEST 3 SCORE: 100% WEIGHT: 1 | TEST 4 SCORE: 60% WEIGHT: 1 | TEST 5 SCORE: 100% WEIGHT: 1 | TEST 6 SCORE: 100% WEIGHT: 3 | TEST 7 SCORE: 100% WEIGHT: 5 |

DUAL NETWORK SECURITY ASSESSMENT ENGINE

CROSS-REFERENCE TO RELATED APPLICATION

This Application claims priority to U.S. Provisional Patent Application Ser. No. 62/738,620, filed on Sep. 28, 2018, entitled "DUAL NETWORK SECURITY ASSESSMENT ENGINE," the entire disclosure of which is incorporated herein by reference.

FIELD

The invention relates generally to detection of security threats in computer systems, and more specifically to a dual network security assessment engine.

BACKGROUND

Computers are valuable tools in large part for their ability to communicate with other computer systems and to retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, web site scanning tools are used to verify the security and integrity of a website, and to identify and fix potential vulnerabilities.

For example, a firewall in a home or office may restrict the types of connection and the data that can be transferred between the internal network and an external network such as the Internet, based on firewall rules and characteristics of known malicious data. The firewall is typically a computerized network device that inspects network traffic that passes through it, permitting passage of desirable network traffic while blocking undesired network traffic based on a set of rules. Similarly, antivirus software executing on individual computer systems within the network examine applications that are executing on the computer and data that is stored on the computer's nonvolatile storage to find known or suspected malicious software or other threats. Other common computer network security systems include security applications on smartphones that evaluate various applications as they execute on a user's smartphone to attempt to block execution of malicious applications, stand-alone appliance such as unified threat management (UTM) devices configured to provide a variety of malicious code protection, and configurable network security features built into routers, switches, and other common network components.

But, networks are constantly changing as new devices are added and firmware or configuration settings are updated, and new threats to computer network security are constantly emerging, making efficient and timely detection of vulnerabilities within a computer network a significant challenge. It is therefore desirable to manage analysis of security risks on a computer network to provide efficient detection and characterization of potential vulnerabilities.

SUMMARY

One example embodiment of the invention comprises a method of determining the security condition of a network by executing an agent program on one or more computerized devices coupled to the network. Each executing agent program executes one or more security tests and reports the results of such tests to a network assessment engine, and the network assessment engine determines an authoritative security test score and a configurable security test score for the network based on a weighted combination of the security test results.

In a further example, weightings for the security test results used to determine the configurable security test score are configured by a user to provide a customized view of potential network security threats. In another example, unassessed tests are removed from being factored into at least one of the authoritative and configurable security scores.

In another example, the security test results are categorized into a plurality of sub-categories which are used to generate sub-category scores. In a yet further example, a weighted combination of the security test results categorized into each of the sub-categories is used to generate the sub-category score for each sub-category, and the weighted combination of sub-category scores is used to generate at least one of the authoritative and configurable security test scores. In another example, the security test results are categorized into sub-categories by security risk type.

In a further example, the configurable security test score is derived from at least one additional or changed test relative to the tests used to derive the authoritative security test score.

The details of one or more examples of the invention are set forth in the accompanying drawings and the description below. Other features and advantages will be apparent from the description and drawings, and from the claims.

BRIEF DESCRIPTION OF THE FIGURES

FIG. 3 shows calculation of an authoritative security score for a simplified network under test, consistent with an example embodiment.

FIG. 4 shows calculation of a configurable security score for a simplified network under test, consistent with an example embodiment.

DETAILED DESCRIPTION

Figure 1:
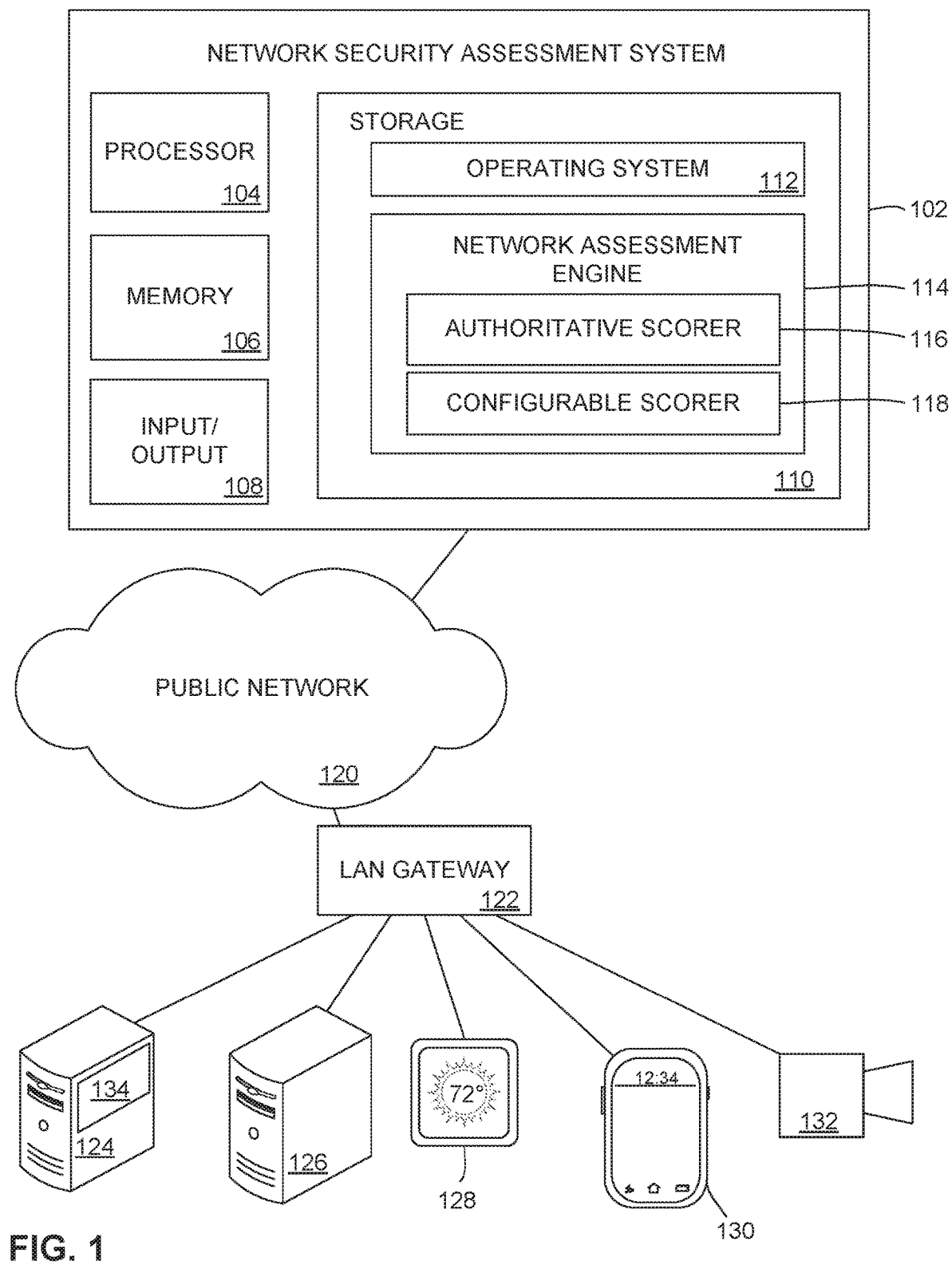
FIG. 1 shows a network environment with a dual network security assessment system, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store such as passwords and financial account information, and even their computing power, become a tempting target for criminals. Hackers regularly attempt to log in to corporate computers to steal, delete, or change information, or to encrypt information and hold it for ransom via "ransomware." Smartphone apps, Java applets, and Microsoft Word documents containing macros and other such common documents are all frequently infected with malware of various types, and users rely on tools such as antivirus software, firewalls, and other malware protection tools to protect their computerized devices from harm. Similarly, an increasing number of devices such as home appliances, vehicles, and other such devices (known collectively as the Internet of Things, or IoT) are connected to networks and are increasingly susceptible to unauthorized interception or modification of data.

In a typical home computer or corporate environment, firewalls inspect and restrict the types of communication that can occur over a network, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes. These firewalls, antivirus programs, and other security measure typically inspect data such as network traffic, executing files, and stored files, and function to prevent transfer, storage, or execution of data believed to be malicious. Determination of whether data is malicious is based on factors such as firewall rules and characteristics of known malicious data. But, as new threats are constantly emerging and the configuration of most networks changes with regularity, efficient and timely detection of vulnerabilities within a computer network remains a significant challenge.

Some examples described herein therefore seek to improve the performance of network security testing software and devices by incorporating network assessment engine that uses input from a variety of tests to generate both authoritative and configurable network security scores. In one such example, one or more devices within a network under test execute a network test application that performs various test on the network environment. The devices report the results of the tests to a network assessment engine executing on a remote server, which receives the test results and uses preconfigured weighting for each test to generate an authoritative network security score and optionally one or more weighted category sub-scores. Similarly, some or all of the same tests used to generate the authoritative network security score are used to generate a configurable network score, which uses weighting for each of the incorporated network tests determined or configurable by the end user to generate the configurable network security score and optionally one or more weighted category sub-scores.

FIG. 1 shows a network environment with a dual network security assessment system, consistent with an example embodiment. Here, a network security assessment system 102 comprises a processor 104, memory 106, input/output elements 108, and storage 110. Storage 110 includes an operating system 112, and a network assessment engine 114 that is operable to generate authoritative and configurable network security scores for a network under test based on weighted test results from devices on the tested network via authoritative scorer 116 and configurable scorer 118.

The network security assessment system is connected via a public network 120 (such as the Internet) to the network being tested, which in this example includes a local area network (LAN) gateway 122, which couples the public network to local network devices such as computers 124 and 126, smart thermostat 128, smartphone 130, and webcam 132. One or more of the local network devices has a network test engine 134 that is operable to perform one or more tests on the local network to determine the security state of the network, and to report the results of the one or more tests to the network security assessment system 102. In this example, some or all of LAN gateway 122, computers 124 and 126, smart thermostat 128, smartphone 130, and webcam 132 on the network execute network test engines, and/or are probed by the security tests run on the network for network security issues.

The network security assessment system 102 receives the test results in the network assessment engine 114, and uses the test results along with assigned weights for each test to generate a network security score for the network. In a more detailed example, the authoritative scorer 116 uses fixed or pre-configured weights to determine an authoritative network score, and a configurable scorer 118 uses weights that can be changed by a system user such as a customer of the network security assessment system to calculate a configurable network security score.

The tests in some examples are run periodically and reported to the network security assessment system, while in other examples the network security assessment system triggers execution of the tests on the devices 122-132 based on one or more factors such as time since the last test, workload of the devices executing the tests or being tested, the nature of known or suspected security threats, and a user's desired or configured test frequency. The test results in some examples are reported back to the network security assessment system when first executed, and subsequent reports are provided as differential or change reports only when the result of a particular security test changes.

In a further example, the tests incorporate one or more of the tests or checks presented in Table 1 below:

TABLE 1

Workstation Antivirus software detection
Workstation Antivirus software status check
Workstation Antivirus software evaluation
Windows Firewall-Domain profile status check
Windows Firewall-Public profile status check
Windows Firewall-Private profile status check
Server antivirus software detection
Wi-Fi Secure Authentication Check
Wi-Fi Network Authentication and Encryption Evaluation
Wi-Fi Network SSID Name Status Check
Wi-Fi Network Strong Password Status Check
User Account Control (UAC) Enabled status check
Automatic Updates status check
Software updates evaluation-Critical updates
Software updates evaluation-Security updates
Software updates evaluation-Definition updates
Software updates evaluation-Feature packs
Software updates evaluation-Service packs
Software updates evaluation-Updates
Software updates evaluation-Update rollups
Software updates evaluation-Tools
Windows patch data collection
Domain user account data collection
Domain user accounts-Password expiry status check
Domain user accounts-Password changes status check
Domain user accounts-Password age status check
Domain user accounts-Reversible password encryption status check
Domain user accounts-Guest and krbtgt (Kerberos Ticket Granting Ticket) accounts status check
Local user accounts-Password expiry status check
Local user accounts-Password changes status check
Local user accounts-Password age status check
Local user accounts-Enabled guest account status check
Domain policy data collection
Domain password policy-Minimum password history status check
Domain password policy-Maximum password age status check
Domain password policy-Password complexity requirements status check
Domain password policy-Reversible password encryption status check
Domain account lockout policy-Lockout threshold status check
Local account policy data collection
Local account password policy-Minimum password history status check
Local account password policy-Minimum password age status check
Local account password policy-Password complexity requirements status check
Local account password policy-Reversible password encryption status check
Local account lockout policy-Lockout threshold status check For example, the "Software Updates Evaluation—Security Updates" test checks to see whether known security updates, such as Linux kernel or other versions are up-to-date, or whether certain security updates, service packs, or driver versions are being employed in a computer running the Windows™ operating system. Because any system missing such security updates may be vulnerable to a known security threat that promoted the update that is missing, the score for this test may be reduced proportionate to the risk presented by the missing update. In a further example, the missing security update is reported as part of the test results to the network security assessment system, so that a user can be notified of the particular update that is missing as part of or in supplement to reporting the network security scores.

The results of the security tests in a further example are grouped by test type to produce sub-scores, which are themselves weighted to produce an overall security score in either the authoritative scorer or configurable scorer. In one such example, an Antivirus Security sub-group contains the group of tests listed in Table 2, while an Update/Patch Security sub-group contains the group of tests listed in Table 3:

TABLE 2

Workstation Antivirus software detection-This test can determine if workstations on the site have Antivirus software installed on them.
Workstation Antivirus software status check-This test determine if installed Antivirus software is enabled on workstations.
Workstation Antivirus software evaluation-This test can determine if installed Antivirus software is up to date on workstations.
Server antivirus software detection-This test can determine if servers on the site have Antivirus software installed on them.

TABLE 3

Automatic Updates status check-This test checks to see if Automatic Updates is enabled. Automatic Updates (AU) is the component of the Windows Server Update Service (WSUS) client that checks for, pulls down, and triggers installations and reboots of approved Microsoft updates from WSUS or Microsoft Update (MU). This component should be enabled to ensure the timely delivery of Microsoft updates to Windows-based operating systems.
Software updates evaluation-Critical updates-This test checks to see if critical software updates are missing. Critical updates are broadly released fixes for specific problems that address critical, non-security related bugs.
Software updates evaluation-Security updates-This test checks to see if security updates are missing. Security updates are broadly released fixes for operating systems and application, addressing security issues. Security updates must be applied as broadly and as soon as possible.
Software updates evaluation-Definition updates-This test checks if virus definitions for Windows Defender and Windows Security Essentials are missing. Definition updates are updates to virus, spyware, and other malware definition files used to identify malicious or potentially unwanted software on Windows devices. Malicious software is constantly evolving, requiring that Antivirus definitions be kept up to date in order to protect from the latest threats.
Software updates evaluation-Feature packs-This test checks if feature packs are missing. Feature packs are new feature releases, usually rolled into products at the next release.
Software updates evaluation-Service packs-This test checks if service packs are missing. Service packs are cumulative sets of all hotfixes, security updates, critical updates, and updates created since the release of the product. Service packs might also contain a limited number of customer-requested design changes or features.
Software updates evaluation-Updates-This test checks to see if software updates are missing. Updates are broadly released fixes for specific problems that address non-critical, non-security related bugs.
Software updates evaluation-Update rollups-This test checks to see if software update rollups are missing. Update rollups are software updates that contain cumulative hotfixes, security updates, critical updates, and updates packaged together for easy deployment.
Software updates evaluation-Tools-This test checks to see if Tool updates are missing. Tool updates are updates to utilities or features that aid in accomplishing a task or set of tasks.
Windows patch data collection-This test verifies that patch data for Windows devices is successfully collected from Windows Server Update Services. If technical issues prevent the collection of patch data, patch-related security tests cannot execute for those devices.

---

Because each sub-category contains tests that are closely related to one another, the weight given to a particular sub-category can be used to adjust the weight given to each of the tests in the sub-category in calculating an overall authoritative or customizable security test result without changing each test's weight individually, making adjustment of weights as network security threats change less difficult.

Detailed Scoring Example: In a more detailed example presented below with accompanying formulas, the score of a security test can be any value between (and including) zero and one. A score of one is considered a perfect score (no risk), while a score of zero means that the test has entirely failed and indicates high risk. When a test is designed to operate on a collection of subjects, the average score against all assessed subjects is deemed the test's score (a.k.a. TestSetAverage). In this example, a security test score is calculated as follows:

$$TestSet = \{TestScore_1, TestScore_2, \ldots TestScore_n\}$$

$$TestSetAverage = \frac{\sum_{i=1}^{n} TestScore_i}{n}$$

In reporting the authoritative network security score, a single score is used to represent the secure nature of a network. For example, a score of one (or 100%) means that a network has passed all tests and is believed to be as secure as it can be, and no further action is necessary. A score of less than one means that some known risks have been identified and could be improved or should be addressed. To provide further insights into the overall security score, it is further broken down into scored sub-categories. When a collection of related tests is grouped together into a category, a specific kind of threat can be independently scored and called out.

Each test used to compute the authoritative network score is assigned a weight by the authority, such as the network security assessment service provider. These weightings help determine the relative threat level of the security tests. The closer a test's weight is to zero, the more that test's risk is accepted as tolerable. The greater a test's weight, the more that test's risk is considered intolerable.

A weighted average is used to calculate category scores. Each category score is calculated as follows:

$$CategoryScore = \frac{\sum_{t=1}^{n} (TestSetAverage_t \cdot TestWeight_t)}{\sum_{t=1}^{n} (TestWeight_t)}$$

Therefore, the impact of any test on the category score can be measured at follows:

$$TestImpact = \frac{(1 - TestSetAverage) \cdot TestWeight}{\sum_{t=1}^{n} (TestWeight_t)}$$

A less-than-perfect test score will bring down the category score by a number of percentage points. The larger the value, the greater the risk attributed to the related test. This impact value can be used to help prioritize remedial activities and to help visualize the relative threat level of test results within a category.

In this example, each category is also assigned a weight. These weights help determine the impact each category will have on the overall network security score. A number of weighting schemes are available and can be selected as appropriate for any client of the network security assessment service and any of its assessed networks.

The overall security score for any given network is calculated as follows:

$$NetworkSecurityScore = \frac{\sum_{c=1}^{n}(CategoryScore_c \cdot CategoryWeight_c)}{\sum_{c=1}^{n}(CategoryWeight_c)}$$

The impact of any category score on the overall score can be measured as follows:

$$CategoryImpact = \frac{(1 - CategoryScore) \cdot CategoryWeight}{\sum_{c=1}^{n}(CategoryWeight_c)}$$

A less-than-perfect category score will bring down the overall score by a number of percentage points. The larger the category impact and corresponding reduction in overall score, the greater the risk attributed to failed tests within the category. This impact value can be used to help prioritize remedial activities and to help visualize the relative threat level of categories.

The impact of any given Security Test on the Overall Score can be measured as follows:

$$TestImpact = \frac{(1 - TestSetAverage) \cdot TestWeight \cdot CategoryWeight}{\sum_{t=1}^{n}(TestWeight_t) \cdot \sum_{c=1}^{n}(CategoryWeight_c)}$$

This impact value can be used to help prioritize remedial activities and to help visualize the relative threat level of test.

A user-configurable assessment provides an additional security assessment that can be used with the authoritative assessment to better understand the security state of a network under test. A user can tailor the configurable assessment to meet different or custom security requirements, such as to more clearly alert a user of concerns particular to a specific network. By adjusting test parameters, by assigning different weightings to tests and categories, and by changing the individual tests and/or categories of tests from consideration, a configurable assessment can provide an entirely different security interpretation that is both useful alone and in comparison to the authoritative assessment that can only by changed by the authority. In still further examples, assigning weights to individual devices, excluding select devices and user accounts from consideration, and other such changes can enable a user to tailor the configurable security assessment to attribute additional weight to mission critical devices and perform other such customizations to tailor the configurable test to their particular needs.

Some security tests executed on the network under test have configurable parameters that affect evaluation of the test. As a simple example, the 'authoritative password length security test' might require a password that is at least 8 characters long to return a perfect score. The configurable security test can instead require a password that is 10 characters long, yielding a different result from the authoritative network test evaluation. In further examples, the logic performed within a test can be customized and adapted to meet the specific requirements of the individual network under test.

The score of a configurable security test in this example is calculated much the same way as the authoritative security test, but with configurable test inclusion, weighting, and parameters in various embodiments. While the network security assessment service provider serves as the authority that determines the significance and severity of any given security threat in calculating the authoritative security score, a user can adjust the configurable security test's weightings of individual security tests to meet the unique requirements of any individual network. For example, the authoritative assessment might not assess missing Windows 'Critical Updates' harshly enough when considering the unique circumstances of a particular network, and increasing the weight of that particular test in the configurable assessment addresses this concern.

Figure 2:
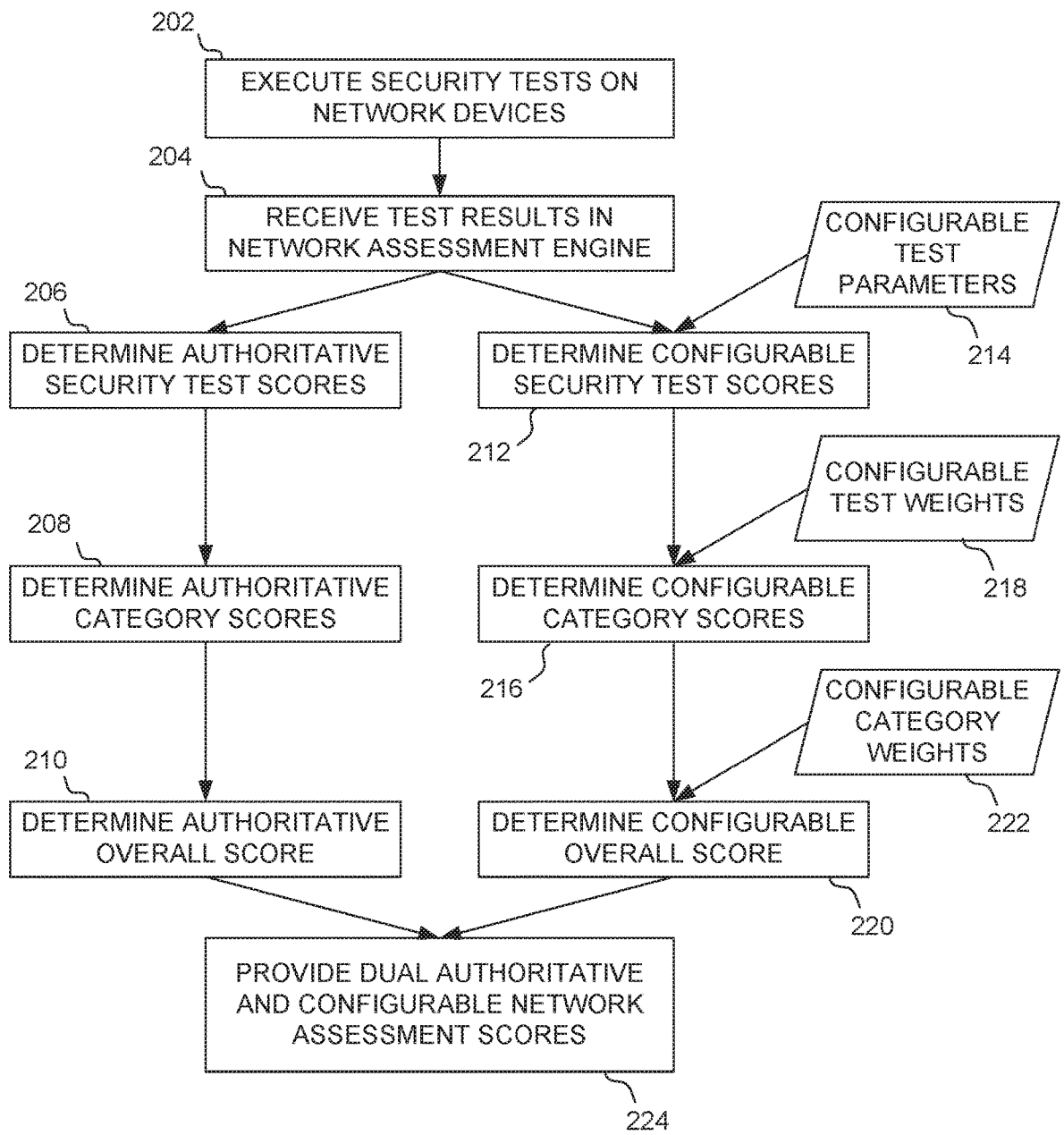
FIG. 2 is a flowchart of a method of generating dual authoritative and configurable network assessment scores, consistent with an example embodiment.

FIG. 2 is a flowchart of a method of generating dual authoritative and configurable network assessment scores, consistent with an example embodiment. Here, the network testing process begins at 202 with executing security tests on devices within the network under test. In further examples, the security tests may be triggered by time, by a manual request to run a test, by a change in threat to the network under test, or by other means. At 204, the network assessment engine receives the security test results from the various network devices that performed the tests, and provides the test results to both the authoritative and configurable scoring systems. The authoritative security test scores are determined at 206, and the category scores are determined at 208 for categories and/or sub-categories of related test scores based on the security test scores and the assigned weighting for each test score. At 210, the authoritative overall score is determined, based on the category scores and the assigned authoritative weighting for each category.

Similarly, the configurable security test scores at 212 are used along with configurable test parameters for scoring the tests at 214 to determine the test results used to determine the configurable category scores at 216. The configurable category scores also use configurable test weights as shown at 218 to determine the impact of each test on the configurable category scores, which are used along with configurable category weights as shown at 222 to determine the configurable overall score at 220.

Both the authoritative overall score as determined at 210 and the configurable overall score as determined at 220 are provided as components of the dual authoritative and configurable network assessment score report at 224, which in further examples includes scores for various tests, categories, and sub-categories of tests to help further understand the test results. In a yet further example, indications of actions to be taken to address one or more tests that did not achieve the desired result are also reported at 224, such as updating a driver or operating system, changing password complexity requirements, or changing other such settings affecting security of the network under test.

FIG. 3 shows calculation of an authoritative security score for a simplified network under test, consistent with an example embodiment. Here, tests 1-7 are each assigned a weight by an authority, and generate a score upon execution based on the results of the individual tests. The weights affect their contribution to the category in which each test resides, such that each category itself has a score derived from the weights and scores of its individual constituent tests. The categories one, two, and three each also have weights, which are used to determine the influence that each category score has on the overall authoritative score, which in this example is disproportionately strongly influenced by Test one and Category one.

FIG. 4 shows calculation of a configurable security score for a simplified network under test, consistent with an example embodiment. Here, the test scores, category scores, and overall scores are calculated as in FIG. 3, using weights that are user-configurable rather than set by the authority providing the network assessment system. More specifically the weight of test one has been reduced from a relative weight of eight to one, such that it no longer determines 40% of the overall score but instead determines about 16.7% of the overall score. Test one also contributes proportionately less to the category one score, which has increased from a score of 40% in the authoritative assessment of FIG. 3 to a score of 75% in the configurable assessment of FIG. 4.

These examples show how a network security assessment system can use tests performed in a network environment to provide security scores for the network that include both an authoritative overall security score and a user-customizable configurable overall security score derived from at least some of the same test data. The ability to alter weights, test parameters, and constituent tests in the configurable overall security score enables a user to tailor the configurable scorer to better reflect certain priorities or risks of interest to the user, while still receiving an authoritative overall score reflecting the weightings and best risk assessment of the network security assessment system provider. The network security assessment system, devices performing tests, and other elements of the examples presented herein may contain various computer components, such as those of the following example.

Figure 5:
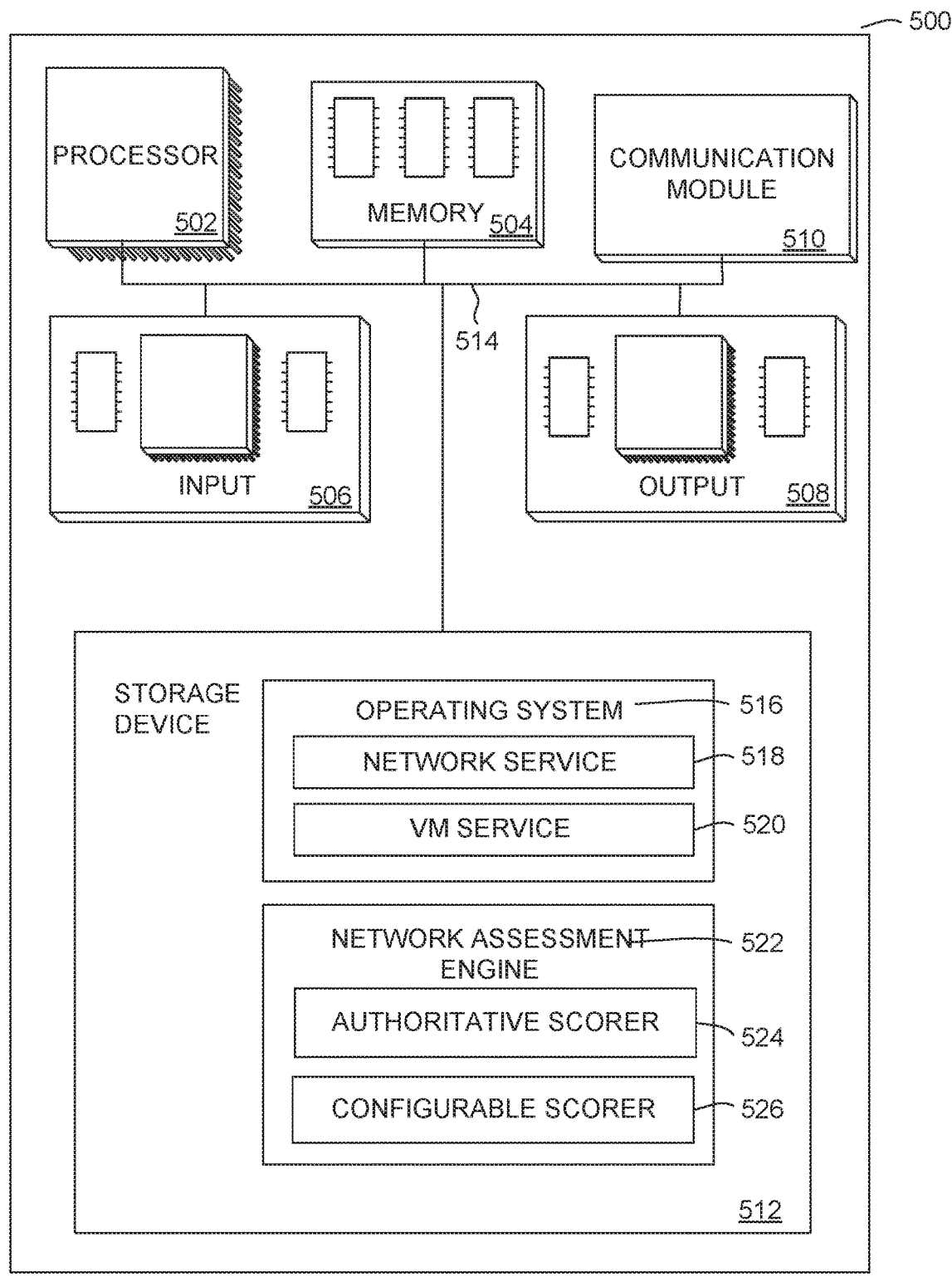
FIG. 5 is a computerized network security assessment system comprising a network assessment engine, consistent with an example embodiment of the invention.

FIG. 5 is a computerized network security assessment system comprising a network assessment engine, consistent with an example embodiment of the invention. FIG. 5 illustrates only one particular example of computing device 500, and other computing devices 500 may be used in other embodiments. Although computing device 500 is shown as a standalone computing device, computing device 500 may be any component or system that includes one or more processors or another suitable computing environment for executing software instructions in other examples, and need not include all of the elements shown here.

As shown in the specific example of FIG. 5, computing device 500 includes one or more processors 502, memory 504, one or more input devices 506, one or more output devices 508, one or more communication modules 510, and one or more storage devices 512. Computing device 500, in one example, further includes an operating system 516 executable by computing device 500. The operating system includes in various examples services such as a network service 518 and a virtual machine service 520 such as a virtual server. One or more applications, such as network assessment engine 522 are also stored on storage device 512, and are executable by computing device 500.

Each of components 502, 504, 506, 508, 510, and 512 may be interconnected (physically, communicatively, and/or operatively) for inter-component communications, such as via one or more communications channels 514. In some examples, communication channels 514 include a system bus, network connection, inter-processor communication network, or any other channel for communicating data. Applications such as network assessment engine 522 and operating system 516 may also communicate information with one another as well as with other components in computing device 500.

Processors 502, in one example, are configured to implement functionality and/or process instructions for execution within computing device 500. For example, processors 502 may be capable of processing instructions stored in storage device 512 or memory 504. Examples of processors 502 include any one or more of a microprocessor, a controller, a digital signal processor (DSP), an application specific integrated circuit (ASIC), a field-programmable gate array (FPGA), a graphics processing unit (GPU), or similar discrete or integrated logic circuitry.

One or more storage devices 512 may be configured to store information within computing device 500 during operation. Storage device 512, in some examples, is known as a computer-readable storage medium. In some examples, storage device 512 comprises temporary memory, meaning that a primary purpose of storage device 512 is not long-term storage. Storage device 512 in some examples is a volatile memory, meaning that storage device 512 does not maintain stored contents when computing device 500 is turned off. In other examples, data is loaded from storage device 512 into memory 504 during operation. Examples of volatile memories include random access memories (RAM), dynamic random access memories (DRAM), static random access memories (SRAM), and other forms of volatile memories known in the art. In some examples, storage device 512 is used to store program instructions for execution by processors 502. Storage device 512 and memory 504, in various examples, are used by software or applications running on computing device 500 such as network assessment engine 522 to temporarily store information during program execution.

Storage device 512, in some examples, includes one or more computer-readable storage media that may be configured to store larger amounts of information than volatile memory. Storage device 512 may further be configured for long-term storage of information. In some examples, storage devices 512 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication modules 510. Computing device 500 in one example uses communication module 510 to communicate with external devices via one or more networks, such as one or more wireless networks. Communication module 510 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 500 uses communication module 510 to communicate with an external device such as via public network 120 of FIG. 1.

Computing device 500 also includes in one example one or more input devices 506. Input device 506, in some examples, is configured to receive input from a user through tactile, audio, or video input. Examples of input device 506 include a touchscreen display, a mouse, a keyboard, a voice responsive system, video camera, microphone or any other type of device for detecting input from a user.

One or more output devices 508 may also be included in computing device 500. Output device 508, in some examples, is configured to provide output to a user using tactile, audio, or video stimuli. Output device 508, in one example, includes a display, a sound card, a video graphics adapter card, or any other type of device for converting a signal into an appropriate form understandable to humans or machines. Additional examples of output device 508 include a speaker, a light-emitting diode (LED) display, a liquid crystal display (LCD), or any other type of device that can generate output to a user.

Computing device 500 may include operating system 516. Operating system 516, in some examples, controls the operation of components of computing device 500, and provides an interface from various applications such as network assessment engine 522 to components of computing device 500. For example, operating system 516, in one example, facilitates the communication of various applications such as network assessment engine 522 with processors 502, communication unit 510, storage device 512, input device 506, and output device 508. Virtual machine (VM) service 520 enables a system such as a server to execute multiple instances of an operating system and/or other services, providing a segregated operating or execution environment for different applications or users. Applications such as network assessment engine 522 may include program instructions and/or data that are executable by computing device 500. As one example, network assessment engine 522 includes an authoritative scorer 524 and a configurable scorer 526 operable to generate authoritative and configurable network security scores to help a user monitor the security state of a network under test. These and other program instructions or modules may include instructions that cause computing device 500 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of determining the security condition of a network, comprising:
executing an agent program on one or more computerized devices coupled to the network, each executing agent program operable to execute one or more security tests and to report the results of such tests to a network assessment engine; and
determining via the network assessment engine a pre-configured authoritative security test score and a user-configurable security test score for the network, the pre-configured authoritative security test score and the user-configurable security test score each based on a differently-weighted combination of the received security test results.

2. The method of determining the security condition of a network of claim 1, wherein the executing an agent program on one or more computerized devices and the determining via the network assessment engine an authoritative and a configurable security test score for the network are performed at regular intervals.

3. The method of determining the security condition of a network of claim 1, wherein the network assessment engine is operable to trigger execution of the agent program on one or more of the computerized devices.

4. The method of determining the security condition of a network of claim 1, wherein weightings for the security test results used in determining the authoritative security test score are configured by a network assessment engine provider based on changes in security threats.

5. The method of determining the security condition of a network of claim 1, wherein weightings for the security test results used in determining the configurable security test score are configured by a user to provide a customized view of potential network security threats.

6. The method of determining the security condition of a network of claim 1, further comprising removing unassessed tests from being factored into at least one of the authoritative and configurable security test scores.

7. The method of determining the security condition of a network of claim 1, wherein the security test results are categorized into a plurality of sub-categories which are used to generate sub-category scores.

8. The method of determining the security condition of a network of claim 7, wherein a weighted combination of the security test results categorized into each of the sub-categories is used to generate the sub-category score for each sub-category, and the weighted combination of sub-category scores is used to generate at least one of the authoritative and configurable security test scores.

9. The method of determining the security condition of a network of claim 7, wherein the security test results are categorized into sub-categories by security risk type.

10. The method of determining the security condition of a network of claim 1, wherein the configurable security test score is derived from at least one additional or changed test relative to the tests used to derive the authoritative security test score.

11. A computerized network assessment system, comprising:
a processor operable to execute computer instructions, and
a set of executable computer instructions configured when executed to:
receive from one or more agent programs on one or more computerized devices coupled to a network being tested the results of one or more security tests executed by the agent programs; and
determine a pre-configured authoritative security test score and a user-configurable security test score for the network, the pre-configured authoritative security test score and the user-configurable security test score each based on a differently-weighted combination of the received security test results.

12. The computerized network assessment system of claim 11, wherein the set of executable instructions when executed are further operable to trigger execution of the security tests on one or more of the computerized devices.

13. The computerized network assessment system of claim 11, wherein weightings for the security test results used in determining the authoritative security test score are configured by a network assessment engine provider based on changes in security threats, and weightings for the security test results used in determining the configurable security test score are configured by a user to provide a customized view of potential network security threats.

14. The computerized network assessment system of claim 11, wherein determining security test scores for the network further comprises removing unassessed tests from being factored into at least one of the authoritative and configurable security test scores.

15. The computerized network assessment system of claim 11, the instructions when executed further operable to categorize the security test results into a plurality of sub-categories and to use the sub-categories to generate sub-category scores.

16. The computerized network assessment system of claim 15, wherein a weighted combination of the security test results categorized into each of the sub-categories is used to generate the sub-category score for each sub-category, and the weighted combination of sub-category scores is used to generate at least one of the authoritative and configurable security test scores.

17. The computerized network assessment system of claim 15, wherein the security test results are categorized into sub-categories by security risk type.

18. The computerized network assessment system of claim 11, wherein the configurable security test score is derived from at least one additional or changed test relative to the tests used to derive the authoritative security test score.

19. A computerized network testing device, comprising:
a processor operable to execute computer instructions, and
a set of executable computer instructions configured when executed to:
run one or more security tests on a network being tested; and
report the results of the one or more security tests to a network assessment system operable to determine a pre-configured authoritative security test score and a user-configurable security test score for the network, the pre-configured authoritative security test score and the user-configurable security test score each based on a differently-weighted combination of the received security test results.

20. The computerized network testing device of claim 19, the set of executable instructions further operated when executed to run the one or more security tests based on data received from the network assessment system.

* * * * *